May 14, 1940.　　　A. EVENSON　　　2,201,083
GRAIN SIEVE
Filed May 2, 1939　　　2 Sheets-Sheet 1
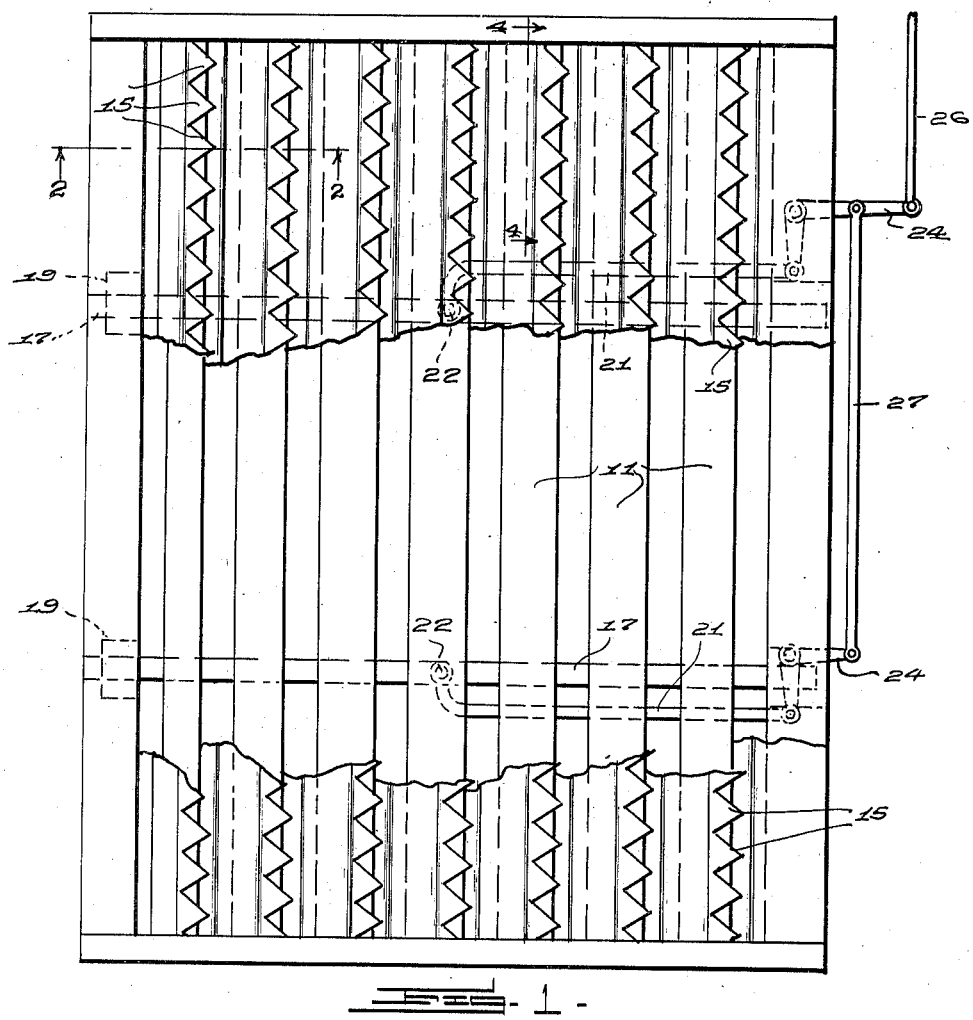
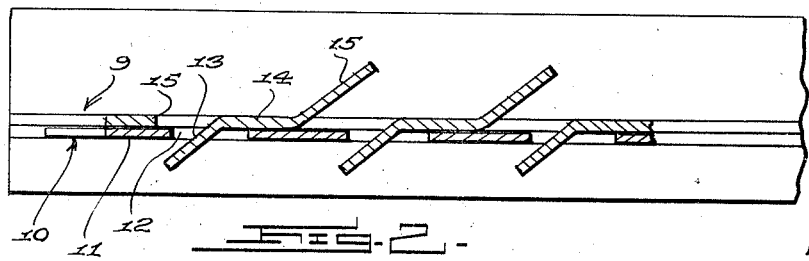
Inventor
ANDREW EVENSON,
By *Clarence A. O'Brien and Hyman Berman*
Attorneys

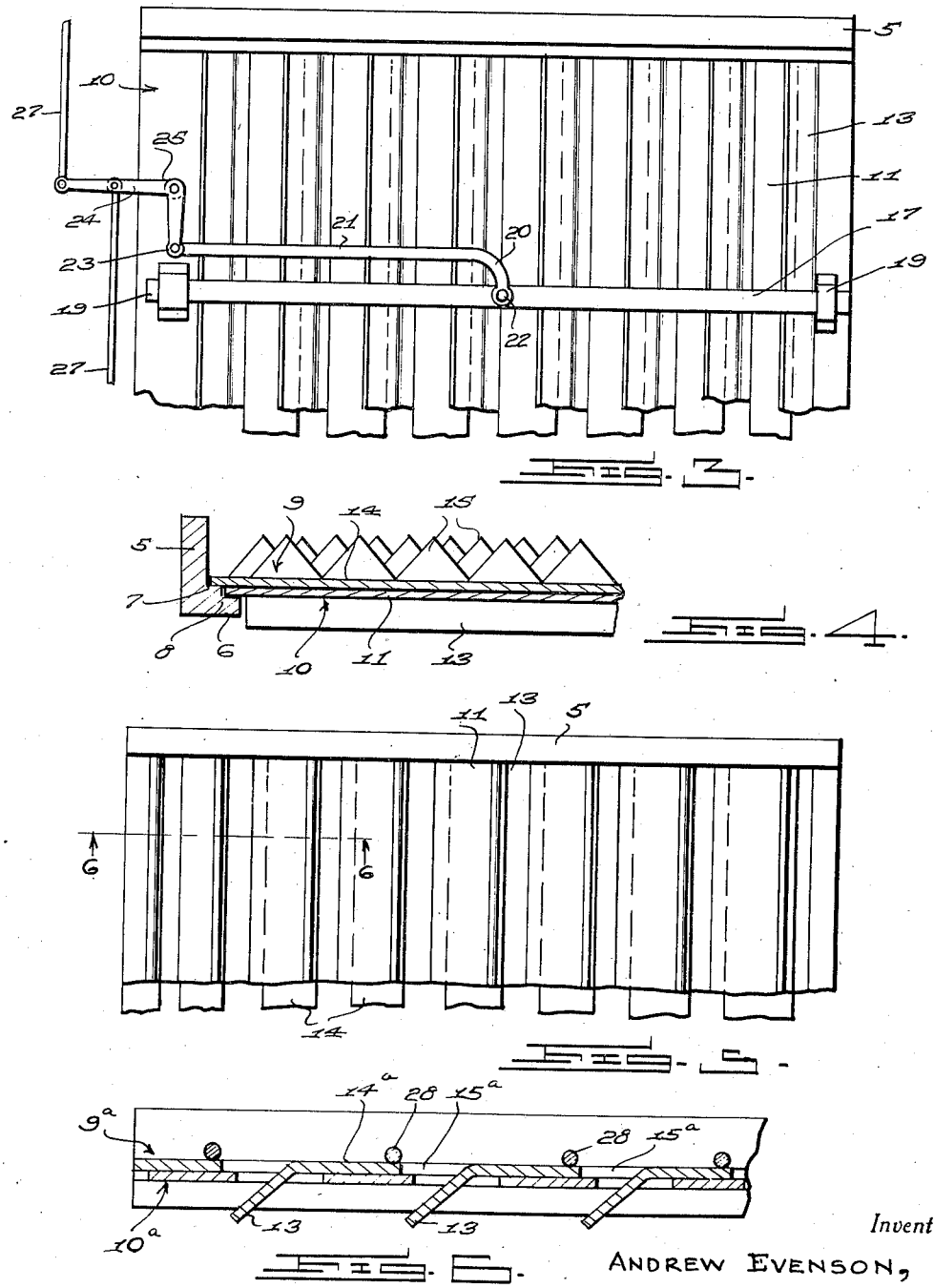

Patented May 14, 1940

2,201,083

UNITED STATES PATENT OFFICE 2,201,083

GRAIN SIEVE

Andrew Evenson, Canby, Minn., assignor of thirty per cent to Sam K. Nomeland, Porter, Minn.

Application May 2, 1939, Serial No. 271,334

2 Claims. (Cl. 209—398)

This invention appertains to new and useful improvements especially adapted for use on grain threshing machines, grain fanning mills and other grain grading apparatus.

The principal object of the present invention is to provide a sieve wherein the parts are adjustable.

Another important object of the invention is to provide a sieve which is contemplated to save grain, in that it is possible to adjust the wind treatment with more precision and results in efficient grain separation.

These and other important objects and advantages of the invention will become apparent to the reader of the following specification.

In the drawings:

Figure 1 represents a top plan view.

Figure 2 is a section on line 2—2 of Figure 1.

Figure 3 is a fragmentary bottom plan view.

Figure 4 is a fragmentary detailed sectional view on line 4—4 of Figure 1.

Figure 5 is a fragmentary top plan view of a modified form of sieve.

Figure 6 is a section on line 6—6 of Figure 5.

Referring to the drawings wherein like numerals designate like parts, it can be seen that the drawings disclose the sieve as it is to be attached to the grain shoe of the thresher. The sieve consists of the two side members 5—5 each of which has an inwardly disposed shoulder 6 having the stepped ledges 7 and 8 for supporting the slidable frame 9 and supporting the stationary frame 10, respectively.

The stationary frame consists of a plate 11 having the plurality of parallel longitudinally extending slots 12 therein through which dip the wind guides or deflectors 13 which incline from the cross members 14 of the slide frame 9. These wind guides 13 are struck downwardly, defining the longitudinal slots 15 in the frame 9 and struck upwardly and further formed to provide the serrations 15. These struck up teeth 15 are disposed in inclined relation as shown in Figure 2 and overlap the downwardly disposed wind guides 13. As a matter of fact the teeth 15 are disposed in substantial parallel spaced relation with respect to the underlying wind guides 13.

Slide bars 17—17 slidably disposed through guides 19 on the bottom of the frame 10, are suitably secured as by welding or the like to the lower edges of the wind guides 13 and each has the curved end portion 20 of a link rod 21 pivotally secured thereto as at 22. The remaining end of the corresponding link rod 21 is pivotally secured as at 23 to one end of the bell crank 24 which is fulcrumed as at 25 on the bottom of the frame 10. The control rod 26 connects to the remaining end of the bell crank 24 and a connecting rod 27 connects the intermediate portions of the outstanding legs of the bell crank 24 as clearly shown in Figure 1.

Obviously whenever desired, the frame 9 can be slid so as to open or close the openings 12 to the desired extent and properly place the wind guides 13 with respect to these slots 12.

As is clearly shown in Figure 4 the teeth or serrations 15 are in offset relation with respect to each other so that kernels which may pass through certain of the rows of teeth will hit against the teeth on one or another of the other rows of teeth and eventually fall through the sieve before passing thereover.

A slightly modified form of the invention is shown in Figure 6 wherein instead of having the upper slidable frame 9a equipped with the teeth 15, the cross members 14a of the frame 9a have wire or rod members 28 secured thereto and extending longitudinally thereof adjacent the corresponding slot 15a. These wires or rods 28 are soldered or otherwise secured to the frame 9a. This type of sieve is especially adapted for use in fanning mills and not on threshing machines.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A sieve comprising a stationary frame including a bottom provided therein with parallel laterally spaced slots extending from side to side thereof, and a plate-like member in said frame slidable therein over said bottom and being provided with slots therein similar to the first-mentioned slots and registerable with the latter under sliding of the member, flanges on said member extending along the slots thereof, respectively, on one side of said slots and from end to end thereof and inclining downwardly through the slots of said frame to provide oblique depending wind guides, and raised elements on said member extending along the slots thereof, respectively, from end to end of said slots and on the other side thereof and providing upstanding wind guides, said elements comprising saw toothed flanges on said member, respectively, inclined in correspondence with the first-mentioned flanges.

2. A sieve comprising a stationary frame including a bottom provided therein with parallel laterally spaced slots extending from side to side thereof, and a plate-like member in said frame slidable therein over said bottom and being provided with slots therein similar to the first-mentioned slots and registerable with the latter under sliding of the member, flanges on said member extending along the slots thereof, respectively, on one side of said slots and from end to end thereof and inclining downwardly through the slots of said frame to provide oblique depending wind guides, and raised elements on said member extending along the slots thereof, respectively, from end to end of said slots and the other side thereof and providing upstanding wind guides, said elements comprising saw toothed flanges on said member, respectively, inclined in correspondence with the first-mentioned flanges, and means for sliding said member.

ANDREW EVENSON.